United States Patent
Szymanski et al.

(10) Patent No.: US 10,371,263 B2
(45) Date of Patent: Aug. 6, 2019

(54) HYDRAULIC SEAL FOR NON-MAINSHAFT, ROTATING TO STATIC

(71) Applicant: UNITED TECHNOLOGIES CORPORATION, Farmington, CT (US)

(72) Inventors: Grace E. Szymanski, Burlington, CT (US); Justin Luong, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/631,714

(22) Filed: Jun. 23, 2017

(65) Prior Publication Data

US 2018/0372227 A1    Dec. 27, 2018

(51) Int. Cl.
| | |
|---|---|
| *F01D 11/04* | (2006.01) |
| *F16J 15/42* | (2006.01) |
| *F01D 11/00* | (2006.01) |
| *F01D 25/18* | (2006.01) |

(52) U.S. Cl.
CPC .............. *F16J 15/42* (2013.01); *F01D 11/04* (2013.01); *F01D 11/003* (2013.01); *F01D 25/183* (2013.01); *F05D 2220/32* (2013.01); *F05D 2240/60* (2013.01)

(58) Field of Classification Search
CPC .......... F16J 15/42; F16J 15/40; F01D 25/183; F01D 11/04
See application file for complete search history.

(56) References Cited

U.S. PATENT DOCUMENTS

| | | | | |
|---|---|---|---|---|
| 822,802 | A * | 6/1906 | Wilkinson | F16J 15/42 277/427 |
| 2,284,465 | A * | 5/1942 | Wood, Jr. | F16J 15/42 277/427 |
| 2,834,618 | A * | 5/1958 | Wiltse | F16J 15/42 277/410 |
| 3,765,688 | A * | 10/1973 | Junker | F16J 15/42 277/428 |

(Continued)

FOREIGN PATENT DOCUMENTS

| | | |
|---|---|---|
| DE | 970408 | 9/1958 |
| FR | 2621970 | 4/1989 |

(Continued)

OTHER PUBLICATIONS

European Patent Office, European Search Report dated Oct. 26, 2018 in Application No. 18168259.2-1006.

*Primary Examiner* — Eugene G Byrd
(74) *Attorney, Agent, or Firm* — Snell & Wilmer, L.L.P.

(57) ABSTRACT

A seal for reducing leakage about a rotating shaft having an axis includes a rotating component configured to be positioned radially outward from and surround the rotating shaft, and including a rotating cylinder defining an annular oil chamber for receiving oil. The seal also includes a static component including a sealing plate configured to extend into the annular oil chamber such that the oil fills a gap between the sealing plate and the rotating cylinder to reduce air leakage between the rotating component and the static component in response to rotation of the rotating component.

19 Claims, 3 Drawing Sheets

(56) References Cited

U.S. PATENT DOCUMENTS

| | | | | |
|---|---|---|---|---|
| 4,076,260 | A | * | 2/1978 | Legoy .................... F16J 15/004 277/425 |
| 6,155,574 | A | * | 12/2000 | Borgstrom ........... F16J 15/4474 277/419 |
| 6,164,658 | A | * | 12/2000 | Collin .................... F01D 11/02 277/418 |
| 6,568,688 | B1 | | 5/2003 | Boeck |
| 7,055,303 | B2 | | 6/2006 | Macfarlane et al. |
| 7,344,139 | B2 | | 3/2008 | Gaebler et al. |
| 8,075,251 | B2 | * | 12/2011 | Purdey .................... F01D 11/04 277/423 |
| 8,794,107 | B2 | * | 8/2014 | Rollins ............... F16H 57/0456 74/606 R |
| 9,133,939 | B2 | | 9/2015 | Scothern et al. |
| 9,157,532 | B2 | * | 10/2015 | Greaves .................. F01D 11/04 |
| 2003/0168815 | A1 | * | 9/2003 | Rensch .................. F01D 11/00 277/409 |
| 2004/0046323 | A1 | | 3/2004 | McCutchan |
| 2005/0230922 | A1 | | 10/2005 | Maguire |
| 2009/0189356 | A1 | * | 7/2009 | Gaebler ................. F01D 11/04 277/431 |
| 2016/0169040 | A1 | | 6/2016 | Anglin et al. |
| 2016/0265432 | A1 | | 9/2016 | Huppe et al. |

FOREIGN PATENT DOCUMENTS

| | | |
|---|---|---|
| FR | 2986568 | 8/2013 |
| GB | 936599 | 9/1963 |
| GB | 972907 | 10/1964 |
| GB | 1284596 | 8/1972 |
| WO | 2008065359 | 6/2008 |

* cited by examiner

HYDRAULIC SEAL FOR NON-MAINSHAFT, ROTATING TO STATIC

GOVERNMENT LICENSE RIGHTS

This disclosure was made with government support under contract FA8626-16-C-2139 and awarded by the United States Air Force. The government has certain rights in the disclosure.

FIELD

The present disclosure is directed to a seal for use with a gas turbine engine and, more particularly, to a seal that utilizes oil in a cavity to resist air leakage through the cavity.

BACKGROUND

Gas turbine engines include a compressor section for compressing air, a combustor section for mixing the compressed air with fuel and combusting the mixture to generate exhaust, and a turbine section for converting the exhaust into torque. The gas turbine engine may also include one or more primary shafts that are coupled to one or more of the compressor section or the turbine section and that rotate about a centerline of the gas turbine engine. Some aircraft may include a secondary rotating shaft that extends perpendicular to the primary shaft and rotates about an axis that is perpendicular to the centerline of the gas turbine engine. It is undesirable for air to leak at the junction of the primary shaft and the secondary shaft for some gas turbine engines.

SUMMARY

Disclosed herein is a seal for reducing leakage about a rotating shaft having an axis. The seal includes a rotating component configured to be positioned radially outward from and surround the rotating shaft, and including a rotating cylinder defining an annular oil chamber for receiving oil. The seal also includes a static component including a sealing plate configured to extend into the annular oil chamber such that the oil fills a gap between the sealing plate and the rotating cylinder to reduce air leakage between the rotating component and the static component in response to rotation of the rotating component.

In any of the foregoing embodiments, the rotating component further includes a collar connected to the rotating cylinder and defining a plurality of oil feed holes configured to receive the oil and to facilitate transfer of the oil to the annular oil chamber.

In any of the foregoing embodiments, the collar is welded to the rotating component after the sealing plate is positioned in the annular oil chamber.

In any of the foregoing embodiments, the static component further includes a static cylinder connected to the sealing plate and configured to be positioned adjacent to and downstream from the rotating component.

In any of the foregoing embodiments, the sealing plate is welded to the static cylinder after the sealing plate is positioned in the annular oil chamber.

In any of the foregoing embodiments, the rotating component is configured to rotate with the rotating shaft and the static component is configured to remain stationary relative to the rotating shaft.

In any of the foregoing embodiments, the rotating shaft is a tower shaft of a gas turbine engine, the tower shaft being configured to interface with a pinion gear of the gas turbine engine.

Also disclosed is a system for reducing leakage about a rotating shaft having an axis. The system includes the rotating shaft. The system further includes a rotating component configured to be positioned radially outward from and surround the rotating shaft, and including a rotating cylinder defining an annular oil chamber configured to receive oil. The system further includes a static component including a sealing plate configured to extend into the annular oil chamber such that the oil fills a gap between the sealing plate and the rotating cylinder to reduce air leakage between the rotating component and the static component in response to rotation of the rotating component.

In any of the foregoing embodiments, the rotating component further includes a collar connected to the rotating cylinder and defining a plurality of oil feed holes configured to receive the oil and to facilitate transfer of the oil to the annular oil chamber.

In any of the foregoing embodiments, the static component further includes a static cylinder connected to the sealing plate and configured to be positioned adjacent to and downstream from the rotating component.

Any of the foregoing embodiments may also include a boss configured to extend radially outward from the rotating shaft and at least one fastener configured to connect the static cylinder to the boss.

Any of the foregoing embodiments may also include an O-ring or gasket seal configured to be positioned between the boss and the static cylinder to reduce the air leakage between the boss and the static cylinder.

Any of the foregoing embodiments may also include a pinion gear configured to be positioned radially between the static component and the rotating shaft.

Any of the foregoing embodiments may also include a spacer configured to be positioned radially between the static component and the pinion gear.

Any of the foregoing embodiments may also include a bearing having a bearing inner race configured to be positioned adjacent the rotating component.

Any of the foregoing embodiments may also include a nut positioned adjacent the spacer, coupled to the pinion gear, and configured to resist axial movement of the spacer and the bearing relative to the rotating shaft.

In any of the foregoing embodiments, the rotating shaft is a tower shaft of a gas turbine engine that includes splines that are configured to interface with the pinion gear.

Also disclosed is a seal for reducing leakage about a rotating shaft having an axis. The seal includes a rotating component configured to be positioned radially outward from and surround the rotating shaft. The rotating component includes a rotating cylinder defining an annular oil chamber for receiving oil, and a collar connected to the rotating cylinder and defining a plurality of oil feed holes configured to receive oil and to facilitate transfer of the oil to the annular oil chamber. The seal further includes a static component. The static component includes a sealing plate configured to extend into the annular oil chamber such that the oil fills a gap between the sealing plate and the rotating cylinder to reduce air leakage between the rotating component and the static component in response to rotation of the rotating component, and a static cylinder connected to the sealing plate and configured to be positioned adjacent to and downstream from the rotating component.

In any of the foregoing embodiments, the collar is welded to the rotating component after the sealing plate is positioned in the annular oil chamber; and the sealing plate is welded to the static cylinder after the sealing plate is positioned in the annular oil chamber.

In any of the foregoing embodiments, the rotating shaft is a tower shaft of a gas turbine engine, the tower shaft being configured to interface with a pinion gear of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine. As used herein, "radially outward" refers to the direction generally away from the axis of rotation of a turbine engine or shaft. As used herein, "radially inward" refers to the direction generally towards the axis of rotation of a turbine engine or shaft.

Figure 1:
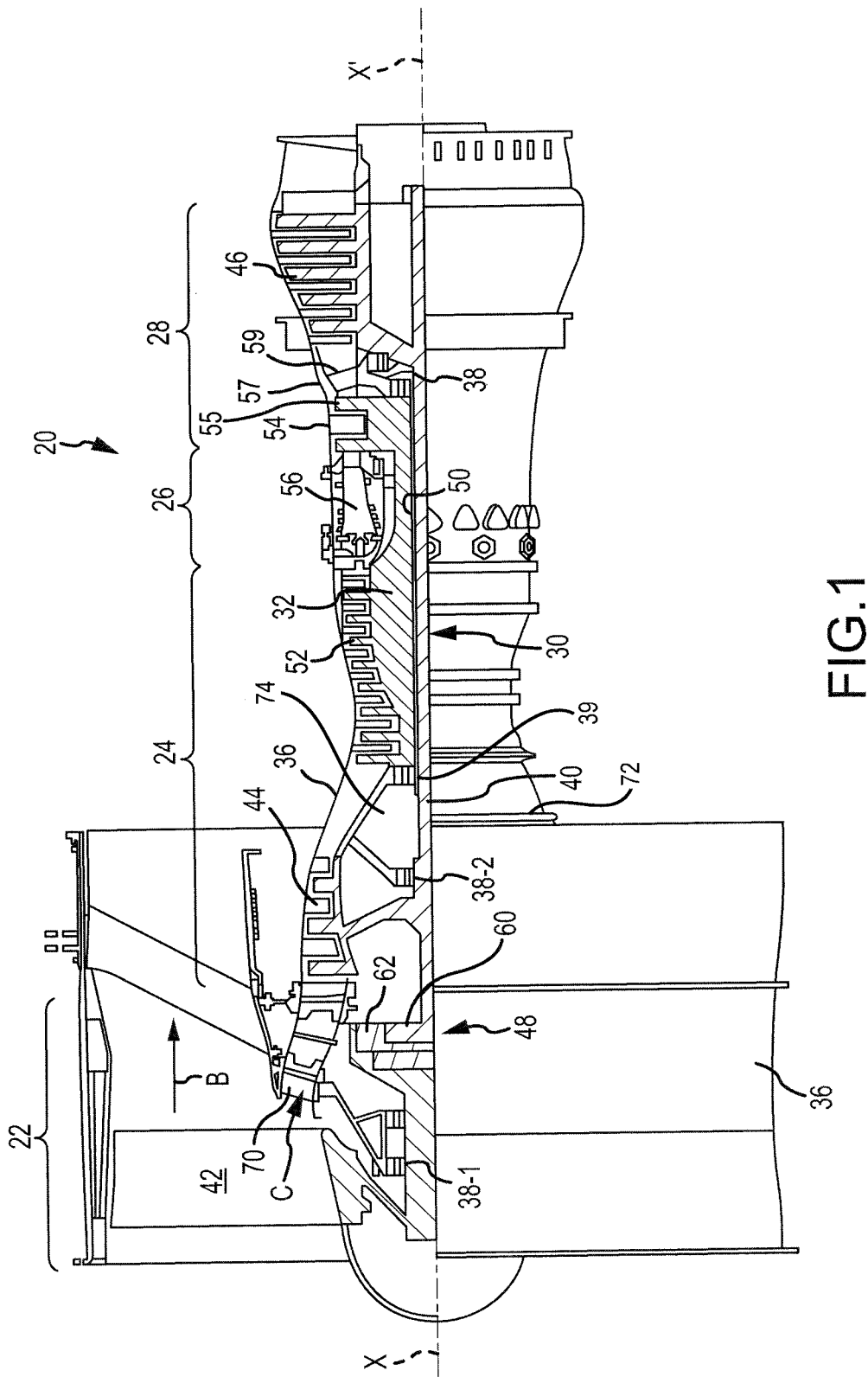
FIG. 1 is a schematic cross-section of a gas turbine engine, in accordance with various embodiments.

In various embodiments and with reference to FIG. 1, a gas turbine engine 20 is provided. The gas turbine engine 20 may be a two-spool turbofan that generally incorporates a fan section 22, a compressor section 24, a combustor section 26 and a turbine section 28. Alternative engines may include, for example, an augmentor section among other systems or features. In operation, the fan section 22 can drive coolant (e.g., air) along a bypass flow path B while the compressor section 24 can drive coolant along a core flow path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures.

The gas turbine engine 20 may generally comprise a low speed spool 30 and a high speed spool 32 mounted for rotation about an engine central longitudinal axis X-X' relative to an engine static structure 36 or engine case via several bearing systems 38, 38-1, and 38-2. It should be understood that various bearing systems 38 at various locations may alternatively or additionally be provided, including for example, the bearing system 38, the bearing system 38-1, and the bearing system 38-2.

The bearing system 38-2 may include a bearing, referred to as a number 3 bearing 39, which is located radially outward from an outer shaft 50, or a high pressure compressor shaft. In that regard, the number 3 bearing 39 may be located in a mid-bearing compartment 74, or number 3 bearing compartment.

The low speed spool 30 may generally comprise an inner shaft 40 that interconnects a fan 42, a low pressure compressor 44 and a low pressure turbine 46. The inner shaft 40 may be connected to the fan 42 through a geared architecture 48 that can drive the fan 42 at a lower speed than the low speed spool 30. The geared architecture 48 may comprise a gear assembly 60 enclosed within a gear housing 62. The gear assembly 60 couples the inner shaft 40 to a rotating fan structure. The high speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of the engine static structure 36 may be located generally between the high pressure turbine 54 and the low pressure turbine 46. The mid-turbine frame 57 may support one or more bearing systems 38 in the turbine section 28. The inner shaft 40 and the outer shaft 50 may be concentric and rotate via bearing systems 38 about the engine central longitudinal axis X-X', which is collinear with their longitudinal axes. As used herein, a "high pressure" compressor or turbine experiences a higher pressure than a corresponding "low pressure" compressor or turbine.

Figure 2:
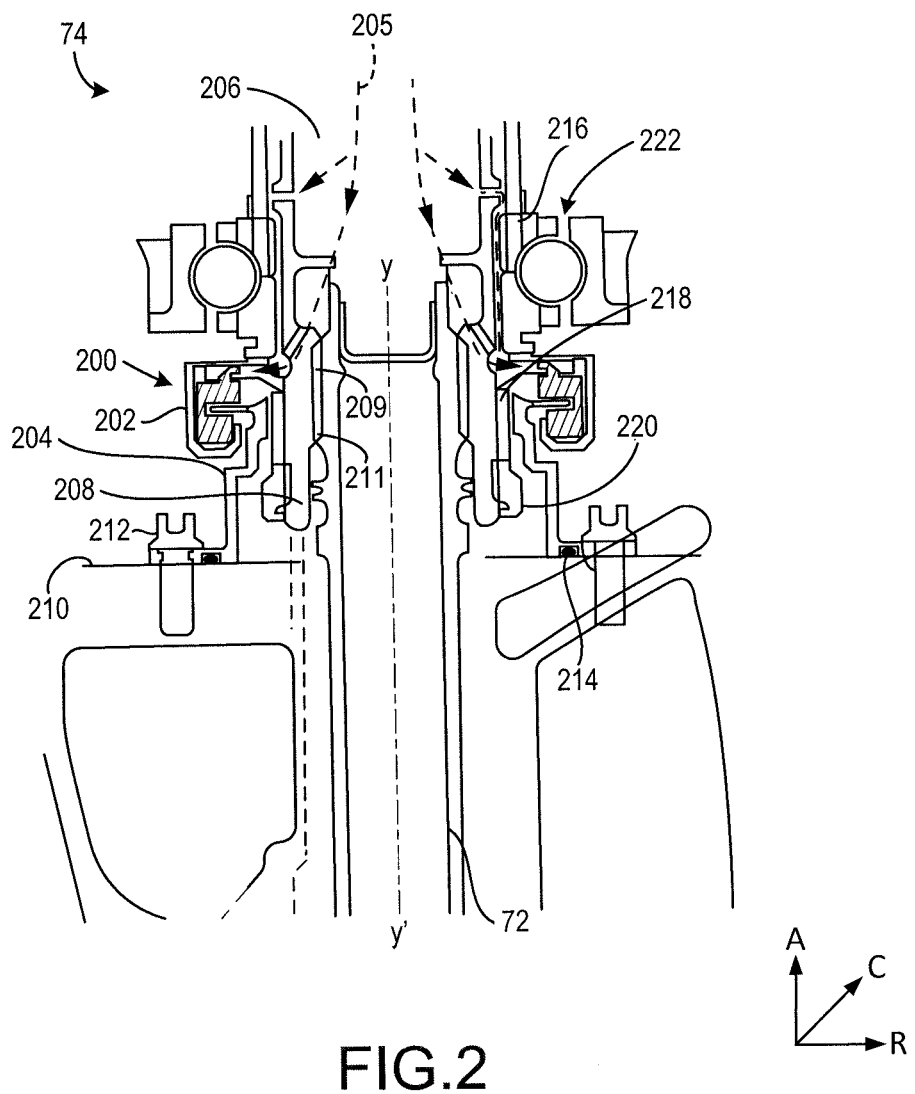
FIG. 2 is a cross-sectional view of a mid-bearing compartment towershaft of the gas turbine engine of FIG. 1, in accordance with various embodiments.

Referring to FIGS. 1 and 2, a tower shaft 72 may extend radially outward from the inner shaft 40. The tower shaft 72 may rotate about its own axis Y-Y'. In that regard, a gear system, such as a pinion gear 208 may interface with the tower shaft 72 and may translate rotation of the inner shaft 40 to the tower shaft 72. In particular, the pinion gear 208 may include splines 209 that interface with splines 211 of the tower shaft 72.

Returning reference to FIG. 1, the airflow of core flow path C may be compressed by the low pressure compressor 44 then the high pressure compressor 52, mixed and burned with fuel in the combustor 56, then expanded over the high pressure turbine 54 and the low pressure turbine 46. The turbines 46, 54 rotationally drive the respective low speed spool 30 and high speed spool 32 in response to the expansion.

The gas turbine engine 20 may be, for example, a high-bypass ratio geared engine. In various embodiments, the bypass ratio of the gas turbine engine 20 may be greater than about six (6). In various embodiments, the bypass ratio of the gas turbine engine 20 may be greater than ten (10). In various embodiments, the geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of the fan 42 may be significantly larger than that of the low pressure compressor 44, and the low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

In various embodiments, the low pressure compressor 44, the high pressure compressor 52, the low pressure turbine 46, and the high pressure turbine 54 may comprise one or more stages or sets of rotating blades and one or more stages or sets of stationary vanes axially interspersed with the associated blade stages but non-rotating about engine central longitudinal axis X-X'. The compressor and turbine sections 24, 28 may be referred to as rotor systems. Within the rotor systems of the gas turbine engine 20 are multiple rotor disks, which may include one or more cover plates or minidisks. Minidisks may be configured to receive balancing weights or inserts for balancing the rotor systems.

Figure 3:
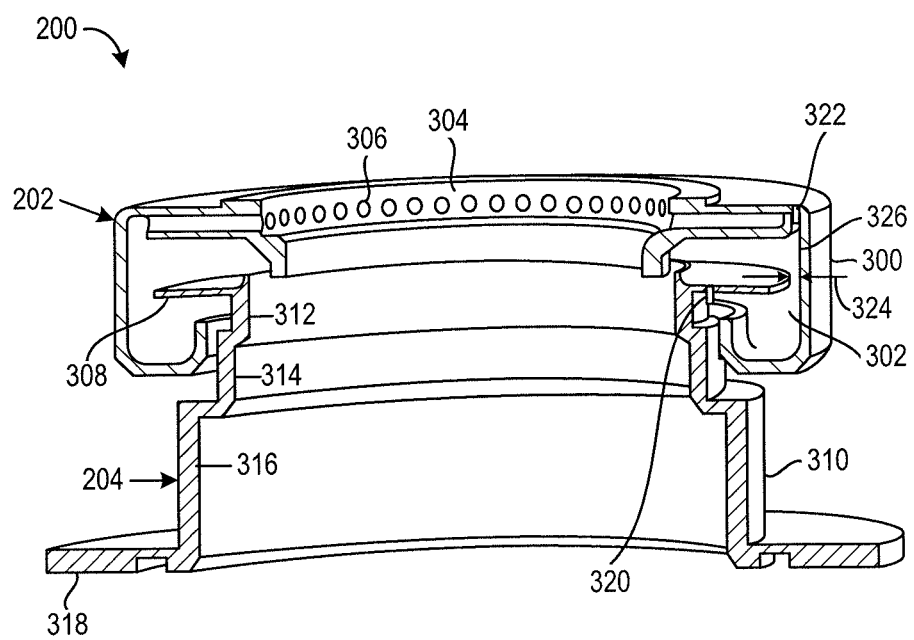
FIG. 3 is an enlarged cross-sectional view of a seal of the mid-bearing compartment of FIG. 2, in accordance with various embodiments.
Figure 3:
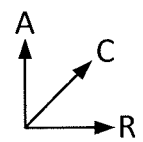

Referring briefly to FIGS. 1, 2, and 3, an A-R-C axis is shown in FIGS. 2 and 3 to illustrate the axial, radial, and circumferential directions relative to the axis Y-Y' of the tower shaft 72. The axial direction (along the axis Y-Y') is perpendicular to the axis X-X' of the gas turbine engine 20.

Referring now to FIGS. 2 and 3, the mid-bearing compartment 74 may include a seal 200 for reducing air leakage about the tower shaft, or rotating shaft, 72. In particular, the seal 200 may include a rotating component 202 that rotates along with the tower shaft 72 about the axis Y-Y', and a static component 204 that remains stationary relative to the tower shaft 72 and the rotating component 202. In particular, air may undesirably leak through an oil passage 206 from the mid-bearing compartment 74 in a direction illustrated by arrows 205. The seal 200 reduces air leakage along this path.

The rotating component 202 and the static component 204 are each positioned radially outward from and surround or enclose the tower shaft 72. The rotating component 202 includes a rotating cylinder 300 connected to a collar 304. The rotating cylinder 300 and the collar 304 each rotate along with the tower shaft 72. The rotating cylinder 300 defines an annular oil chamber 302. In that regard, the rotating cylinder 300 may have any shape that defines an annular oil chamber. The collar 304 defines a plurality of oil feed holes 306 that receive oil from the oil passage 206 and facilitate transport of the oil to the annular oil chamber 302.

The static component 204 includes a sealing plate 308 and a static cylinder 310. The sealing plate 308 extends into the annular oil chamber 302. In various embodiments, a gap 324 may exist between the sealing plate 308 and an inner wall 326 of the rotating cylinder 300.

Any air leakage that occurs may leak between the rotating component 202 and the static component 204. The seal 200 is designed to reduce such air leakage. In particular, as the rotating component 202 rotates about the axis Y-Y', the oil flows through the plurality of oil feed holes 306 and is received in the annular oil chamber 302. Centrifugal force due to the rotation forces the oil towards the inner wall 326. A sufficient amount of oil may be received in the annular oil chamber 302 to fill the gap 324 with oil. In that regard, because the gap 324 may be filled with oil, the oil reduces the ability of air to flow through the gap 324.

The static cylinder 310 may be designed to surround the tower shaft 72 and maybe coupled to a static structure. The static cylinder 310 may have any shape that allows the static cylinder 310 to extend around the tower shaft 72 and facilitates connection of the static cylinder 310 to the static structure. As shown, the static cylinder 310 may include a stepped cylinder having a first step 312, a second step 314, and a third step 316. The static cylinder 310 may further include an attachment platform 318 extending radially outward from the third step 316.

Due to the shape of the seal 200, the various components may be manufactured separately and then coupled together in place, such as by welding, brazing, or other suitable technique. In particular, each of the rotating cylinder 300, the collar 304, the sealing plate 308, and the static cylinder 310 may be manufactured separately. The sealing plate 308 and the static cylinder 310 may be placed together, optionally with the rotating cylinder 300 positioned about the sealing plate 308. The sealing plate 308 and the static cylinder 310 may then be welded at a first weld location 320. Afterwards, the collar 304 and the rotating cylinder 300 may be placed together with the rotating cylinder 300 positioned about the sealing plate 308. The collar 304 and the rotating cylinder 300 may then be welded at a second weld location 322.

The rotating cylinder 300, the collar 304, the sealing plate 308, and the static cylinder 310 may each include the same material or different materials. In various embodiments, these components may include the same material as the other components of the mid-bearing compartment. For example, the rotating cylinder 300, the collar 304, the sealing plate 308, and the static cylinder 310 may each include a nickel-based alloy, a cobalt-based alloy, or the like. Where used in this context, a nickel-based alloy includes more nickel by weight percent (wt %) than any other single element and, where used in this context, a cobalt-based alloy includes more cobalt by wt % than any other single element. For example, a compound having 40% nickel, 30% cobalt and 30% aluminum may be referred to as a nickel-based alloy.

For example, the rotating cylinder 300, the collar 304, the sealing plate 308, and the static cylinder 310 may each include a high performance nickel-based super alloy (i.e., an alloy that comprises, by wt %, 58% nickel, 19% chromium, 13% cobalt, 4% molybdenum, 3% titanium and 1.4% aluminum that is available under the trade name Waspaloy™, available from Special Metals Corporation of New Hartford, N.Y.). As another example, the rotating cylinder 300, the collar 304, the sealing plate 308, and the static cylinder 310 may each include a cobalt-nickel-chromium-tungsten alloy (i.e., an alloy that comprises, by wt %, 39% cobalt, 22% nickel, 22% chromium and 14% tungsten that is available under the trademark HAYNES™ 188, available from Haynes International, Inc. of Kokomo, Ind., USA). As yet another example, the rotating cylinder 300, the collar 304, the sealing plate 308, and the static cylinder 310 may each include an austenitic nickel-chromium-based alloy (i.e., an alloy that by comprises, by wt %, between 17% and 21% chromium, between 2.8% and 3.3% molybdenum, between 50% and 55% nickel, and between 4.75% and 5.5% niobium that is available under the trade name INCONEL 718, available from the Special Metals Corporation of Huntington, W. Va., USA).

In various embodiments, the collar 304 may be designed to contact a portion of the tower shaft 72. In that regard, friction between the tower shaft 72 and the collar 304 may cause the collar 304, and thus the rotating component 202, to rotate along with the tower shaft 72.

The attachment platform 318 of the static component 204 may be coupled to a boss, or flange, 210 that is positioned radially outward from the tower shaft 72. The boss 210 may be stationary relative to the tower shaft 72. In various embodiments, a fastener 212 may be used to couple the attachment platform 318 to the boss 210.

In various embodiments, an O-ring 214 (or a gasket seal 214) may be located axially between the attachment platform 318 and the boss 210. The O-ring 214 (or gasket seal) may provide sealing functionality between the attachment platform 318 and the boss 210.

Referring briefly to FIGS. 1 and 2, the tower shaft 72 may be coupled to the low speed spool 30. The pinion gear 208 may be used to transfer rotation of the low speed spool 30 about the axis X-X' into rotation of the tower shaft 72 about the axis Y-Y'.

Returning reference to FIGS. 2 and 3, the pinion gear 208 may be located radially between the static component 204 and the tower shaft 72. The pinion gear 208 may have one or more spline 209. The tower shaft 72 may have one or more spline 211. The spline 209 of the pinion gear 208 interfaces with the spline 211 of the tower shaft 72 to effect rotation of the tower shaft 72 about the axis Y-Y'.

The mid-bearing compartment 74 may include a bearing 222 having a bearing inner race 216. The bearing inner race 216 may be positioned axially adjacent the collar 304 of the rotating component 202. A spacer 218 may be positioned axially adjacent the collar 304 such that the collar 304 is positioned axially between the spacer 218 and the bearing inner race 216. The spacer 218 may be positioned radially between the tower shaft 72 and the static cylinder 310 of the static component 204. In various embodiments, the spacer 218 may be positioned radially between the pinion gear 208 and the static cylinder 310.

A nut 220 may be positioned axially adjacent the spacer 218. The nut 220 may be coupled to the pinion gear 208. In that regard, the nut 220 may resist axial movement of the spacer 218. In turn, the spacer 218 may resist axial movement of the collar 304, which in turn may resist axial movement of the bearing inner race 216.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A seal for reducing leakage about a rotating shaft having an axis, the seal comprising:

a rotating component configured to be positioned radially outward from and surround the rotating shaft, and including a rotating cylinder defining an annular oil chamber for receiving oil;

a static component having:

a stepped cylinder having multiple steps of increasing diameter from an inner step to an outer step, the outer step having a greater diameter than the inner step, a sealing plate extending radially inward from the inner step and configured to extend into the annular oil chamber such that the oil fills a gap between the sealing plate and the rotating cylinder to reduce air leakage between the rotating component and the static component in response to rotation of the rotating component, and an attachment platform extending away from the outer step and configured to couple the static component to an external component; and a pinion gear configured to be positioned radially between the static component and the rotating shaft.

2. The seal of claim 1, wherein the rotating component further includes a collar connected to the rotating cylinder and defining a plurality of oil feed holes configured to receive the oil and to facilitate transfer of the oil to the annular oil chamber.

3. The seal of claim 2, wherein the collar is welded to the rotating component after the sealing plate is positioned in the annular oil chamber.

4. The seal of claim 1, wherein the stepped cylinder is configured to be positioned adjacent to and downstream from the rotating component.

5. The seal of claim 4, wherein the sealing plate is welded to the stepped cylinder after the sealing plate is positioned in the annular oil chamber.

6. The seal of claim 1, wherein the rotating component is configured to rotate with the rotating shaft and the static component is configured to remain stationary relative to the rotating shaft.

7. The seal of claim 1, wherein the rotating shaft is a tower shaft of a gas turbine engine.

8. A system for reducing leakage about a rotating shaft having an axis, the system comprising:

the rotating shaft;

a rotating component configured to be positioned radially outward from and surround the rotating shaft, and including a rotating cylinder defining an annular oil chamber configured to receive oil;

a static component having:

a stepped cylinder having multiple steps of increasing diameter from an inner step to an outer step, the outer step having a greater diameter than the inner step, a sealing plate extending radially inward from the inner step and configured to extend into the annular oil chamber such that the oil fills a gap between the sealing plate and the rotating cylinder to reduce air leakage between the rotating component and the static component in response to rotation of the rotating component, and an attachment platform extending away from the outer step and configured to couple the static component to an external component; and a pinion gear configured to be positioned radially between the static component and the rotating shaft.

9. The system of claim 8, wherein the rotating component further includes a collar connected to the rotating cylinder and defining a plurality of oil feed holes configured to receive the oil and to facilitate transfer of the oil to the annular oil chamber.

10. The system of claim 9, wherein the stepped cylinder is configured to be positioned adjacent to and downstream from the rotating component.

11. The system of claim 10, further comprising a boss configured to extend radially outward from the rotating shaft and at least one fastener configured to connect the stepped cylinder to the boss.

12. The system of claim 11, further comprising an O-ring or gasket seal configured to be positioned between the boss and the stepped cylinder to reduce the air leakage between the boss and the static cylinder.

13. The system of claim 10, further comprising a spacer configured to be positioned radially between the static component and the pinion gear.

14. The system of claim 13, further comprising a bearing having a bearing inner race configured to be positioned adjacent the rotating component.

15. The system of claim 14, further comprising a nut positioned adjacent the spacer, coupled to the pinion gear, and configured to resist axial movement of the spacer and the bearing relative to the rotating shaft.

16. The system of claim 10, wherein the rotating shaft is a tower shaft of a gas turbine engine that includes splines that are configured to interface with the pinion gear.

17. A seal for reducing leakage about a rotating shaft having an axis, the seal comprising:

a rotating component configured to be positioned radially outward from and surround the rotating shaft, and including:

a rotating cylinder defining an annular oil chamber for receiving oil, and a collar connected to the rotating cylinder and defining a plurality of oil feed holes configured to receive oil and to facilitate transfer of the oil to the annular oil chamber;

a static component including:

a stepped cylinder having multiple steps of increasing diameter from an inner step to an outer step, the outer step having a greater diameter than the inner step, the stepped cylinder configured to be positioned adjacent to and downstream from the rotating component, a sealing plate configured to extend into the annular oil chamber from the inner step such that the oil fills a gap between the sealing plate and the rotating cylinder to reduce air leakage between the rotating component and the static component in response to rotation of the rotating component, and an attachment platform extending away from the outer step and configured to couple the static component to an external component; and a pinion gear configured to be positioned radially between the static component and the rotating shaft.

18. The seal of claim 17, wherein:

the collar is welded to the rotating component after the sealing plate is positioned in the annular oil chamber; and the sealing plate is welded to the static stepped cylinder after the sealing plate is positioned in the annular oil chamber.

19. The seal of claim 17, wherein the rotating shaft is a tower shaft of a gas turbine engine.

* * * * *